United States Patent
Huang et al.

(10) Patent No.: US 12,147,235 B2
(45) Date of Patent: Nov. 19, 2024

(54) METHOD FOR GENERATING ROBOT EXPLORATION PATH FOR A ROBOT TO MOVE ALONG, COMPUTER DEVICE, AND STORAGE MEDIUM

(71) Applicant: SHENZHEN UNIVERSITY, Guangdong (CN)

(72) Inventors: Hui Huang, Shenzhen (CN); Pengdi Huang, Shenzhen (CN); Kai Xu, Shenzhen (CN)

(73) Assignee: Shenzhen University (CN)

( * ) Notice: Subject to any disclaimer, the term of this patent is extended or adjusted under 35 U.S.C. 154(b) by 1094 days.

(21) Appl. No.: 16/982,173

(22) PCT Filed: Sep. 10, 2019

(86) PCT No.: PCT/CN2019/105151
§ 371 (c)(1),
(2) Date: Sep. 18, 2020

(87) PCT Pub. No.: WO2021/022615
PCT Pub. Date: Feb. 11, 2021

(65) Prior Publication Data
US 2023/0096982 A1    Mar. 30, 2023

(30) Foreign Application Priority Data
Aug. 2, 2019   (CN) .......................... 201910713503.6

(51) Int. Cl.
*G05D 1/02* (2020.01)
*G05D 1/00* (2006.01)

(52) U.S. Cl.
CPC .......... *G05D 1/0217* (2013.01); *G05D 1/024* (2013.01); *G05D 1/0274* (2013.01)

(58) Field of Classification Search
CPC .... G05D 1/0217; G05D 1/024; G05D 1/0274; G05D 1/02
(Continued)

(56) References Cited

U.S. PATENT DOCUMENTS 10,427,676 B2 * 10/2019 Jafari Tafti ............ G08G 1/163
11,069,082 B1 * 7/2021 Ebrahimi Afrouzi .. H04N 23/56
(Continued)

FOREIGN PATENT DOCUMENTS

CN   103268729 A  *  8/2013
CN   105427293 A      3/2016
(Continued)

OTHER PUBLICATIONS

Sebastian Lague, "A* Pathfinding (E01: algorithm explanation)", 2014, YouTube, https://www.youtube.com/watch?v=-L-WgKMFuhE (Year: 2014).*
(Continued)

*Primary Examiner* — Jelani A Smith
*Assistant Examiner* — George A Alcorn, III
(74) *Attorney, Agent, or Firm* — Polsinelli PC

(57) ABSTRACT

A method for generating a robot exploration path for a robot to move along includes: establishing a point cloud scene according to single-frame point cloud data collected by the robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a
(Continued)

plurality of access nodes according to the confidence map; and generating an exploration path according to the access nodes.

15 Claims, 8 Drawing Sheets

(58) Field of Classification Search
USPC .......................................................... 701/25
See application file for complete search history.

(56) References Cited

U.S. PATENT DOCUMENTS

| | | | |
|---|---|---|---|
| 2012/0179635 A1* | 7/2012 | Vasudevan | G06T 7/521 |
| | | | 703/2 |
| 2016/0167226 A1 | 6/2016 | Schnittman | |
| 2018/0120116 A1* | 5/2018 | Rombouts | G01S 17/89 |
| 2018/0281191 A1* | 10/2018 | Sinyavskiy | A47L 11/4061 |
| 2018/0364717 A1* | 12/2018 | Douillard | G01S 17/931 |
| 2019/0163958 A1* | 5/2019 | Li | G01S 17/931 |
| 2020/0117212 A1* | 4/2020 | Tian | G01C 21/206 |
| 2020/0326711 A1* | 10/2020 | Rimmer | G01C 21/203 |

FOREIGN PATENT DOCUMENTS

| | | | | |
|---|---|---|---|---|
| CN | 105700525 A | * | 6/2016 | ............ G05D 1/02 |
| CN | 108241370 A | | 7/2018 | |
| CN | 108761474 A | | 11/2018 | |
| CN | 108803659 A | | 11/2018 | |
| CN | 109085836 A | | 12/2018 | |
| CN | 109341707 A | | 2/2019 | |
| CN | 109543601 A | | 3/2019 | |
| CN | 109857123 A | | 6/2019 | |
| CN | 110044359 A | | 7/2019 | |
| EP | 2 669 633 A2 | | 12/2013 | |
| JP | 2017211366 A | * | 11/2017 | ............ B60K 35/00 |
| WO | 2012/122588 A1 | | 9/2012 | |
| WO | 2018/196000 A1 | | 11/2018 | |

OTHER PUBLICATIONS

Qiu et al., Robot_Terrain_Inclination_model_extracted_from_laser_scanner_data_for_outdoor_environment, 2012, IEEE, 2012 IEEE International Conference on Mechatronics and Automation (Year: 2012).*
D21—"Research and Implementation of Obstacle Avoidance Technology for Indoor Mobile Robot", 68 pages (w/ English Abstract).
D8—"Robot Terrain Inclination Model Extracted From Laser Scanner Dada for Outdoor Environment", Dissertation for the Master Degree in Engineering, Dec. 2012, 53 pages (w/English Abstract).
D20—"Visibility Analysis of Selected Scenes in 3D Laser Scanning Point Clouds", May 2017, pp. 93-95.
Gardecki et al., "Implementation of an External Laser Scanner into Control System of the NAO Robot", IFAC PapersOnline 51-6, (2018), pp. 231-237.
Pengpeng et al., "A 3D Data Lidar Based Dedicated Road Boundary Detection Algorithm for Autonomous Vehicles", IEEE Access, Dec. 2018. pp. 1-17.
Qin et al., "Laplace-Beltrami Operator on Point Clouds Based on Anisotropic Voronoi Diagram", Computer Graphics Forum, vol. 00, No. 0, (2017), pp. 1-12.
Rong-Hua et al., "Grid map building based on prediction of local features", Journal of Harbin Institute of Technology, vol. 36, No. 7, Jul. 2004, pp. 878-879 (w/English Abstract).
Yang et al., "An Efficient Spatial Representation for Path Planning of Ground Robots in 3D Environments", IEEE Access, vol. X, 2018, pp. 1-12.

* cited by examiner

METHOD FOR GENERATING ROBOT EXPLORATION PATH FOR A ROBOT TO MOVE ALONG, COMPUTER DEVICE, AND STORAGE MEDIUM

CROSS REFERENCES TO RELATED APPLICATION

This application is a National Phase of International Application No. PCT/CN2019/105151, filed Sep. 10, 2019, which claims priority to Chinese Patent Application No. 2019107135036, filed on Aug. 2, 2019, entitled "METHOD COMPUTER DEVICE, AND STORAGE MEDIUM FOR GENERATING ROBOT EXPLORATION PATH", the contents of which are incorporated herein by reference in their entireties.

TECHNICAL FIELD

The present disclosure relates to the field of data processing technology, and more particularly, to a method for generating a robot exploration path, a computer device, and a computer-readable storage medium.

BACKGROUND

In recent years, lidar scanning technology has developed rapidly, and the large-scale mass production of lidar has made robots using lidar technology to perform three-dimensional collection for outdoor scenes as the mainstream collection means. The three-dimensional laser scanner scans the environment where it is located by moving in a laser scanning line, and converts the three-dimensional environment into three-dimensional point cloud data with points representing surfaces. Therefore, the laser point cloud data records the three-dimensional surface geometry information of the environment. The autonomous exploration and scanning technology of the robot requires that the robot can intelligently analyze the connection structure of the scene, plan the exploration path, and finally form a high-quality environmental map in the moving and scanning.

The exploration methods of robots in unknown scenes are mainly divided into the following types: a potential field method, a frontier point method, a random walk method, and the like. For the potential field method, its essence is to establish a potential energy field in the environment. The idea of generating the force field is that obstacles will repel the robot, while unknown area will generate gravitational force on the robot. For example, the gradient field using the gradient value as the characteristic value of the potential energy field, the tensor field using the tensor value as the potential energy, and the like. The frontier point method is to set the target point at the outermost periphery of the exploration area, that is, the position of the forefront of the known area. In addition, there are methods that use random walks. Simple random walks randomly walk to any position to fill and cover until the entire scene is completely covered. This type of method requires a clear destination location.

Traditional exploration methods are mainly oriented to indoor enclosed environments. The indoor closed environment itself is surrounded by obstacles, and the channel structure is narrow, long and obvious. Therefore, existing technologies such as the potential field method mainly push the robot forward through the resultant force between the obstacles. However, in an unknown outdoor environment, if the obstacles are concentrated in one place, the resultant force on the robot will cause the robot to stay in the open area and cannot fully scan. The frontier point method and random walk method cannot face a completely open environment, which will make these types of methods lose their directions.

The details of one or more embodiments of the disclosure are set forth in the accompanying drawings and description below. Other features, purposes and advantages of the present disclosure will become apparent from the description, the accompanying drawings, and the claims.

SUMMARY

According to various embodiments of the present disclosure, a method for generating a robot exploration path, a computer device, and a computer-readable storage medium are provided.

In a first aspect, a method for generating a robot exploration path is provided in an embodiment of the present disclosure, and the method includes:

Establishing a point cloud scene according to single-frame point cloud data collected by a robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a plurality of access nodes according to the confidence map; and generating an exploration path according to the access nodes.

In a second aspect, a computer device is provided in an embodiment of the present disclosure. The computer device includes a memory and a processor. The memory is stored with a computer program. When the computer program is executed by the processor, the following steps are implemented: establishing a point cloud scene according to single-frame point cloud data collected by a robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a plurality of access nodes according to the confidence map; and generating an exploration path according to the access nodes.

In a third aspect, a computer readable storage medium is provided. A computer program is stored on the computer readable storage medium. When the computer program is executed by a processor, the following steps are implemented: establishing a point cloud scene according to single-frame point cloud data collected by a robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a plurality of access nodes according to the confidence map; and generating an exploration path according to the access nodes.

In the above method for generating a robot exploration path, computer device, and storage medium, a point cloud scene is established through the collected single-frame point cloud data, and the confidence of the ground point cloud obtained by the classification in the point cloud scene is calculated, and the confidence map is drawn, the access nodes are acquired through the confidence map and the exploration path is generated. Therefore, the point cloud scene is continuously updated by way of collecting and accumulating single-frame point cloud data, so that the ground point cloud, the confidence map, the access nodes and the exploration path obtained in this disclosure will be updated in real time. The robot is driven to a current under-scanned area, so that the scanning quality and scanning efficiency can be improved. And, by drawing the confidence map to determine the exploration path, it can adapt to an unknown environment of open and narrow joint distribution, and improve the adaptability of the exploration path to the unknown environment.

BRIEF DESCRIPTION OF THE DRAWINGS

In order to better illustrate the technical solutions in the embodiments of the present disclosure or the prior art, the accompanying drawings used in the embodiments or the prior art description are briefly described below. Obviously, the drawings in the following description are only several embodiments of the present disclosure, while it will be understood that other drawings may be obtained according to these drawings without any inventive step for those skilled in the art.

DETAILED DESCRIPTION

To make the purposes, technical solutions, and advantages of the present disclosure to be more apparent and understandable, reference will be made to the accompanying drawings and embodiments to describe the present disclosure in detail below. It should be understood that the specific embodiments described herein are only used to explain the present disclosure and not intended to limit the present disclosure.

Figure 1:
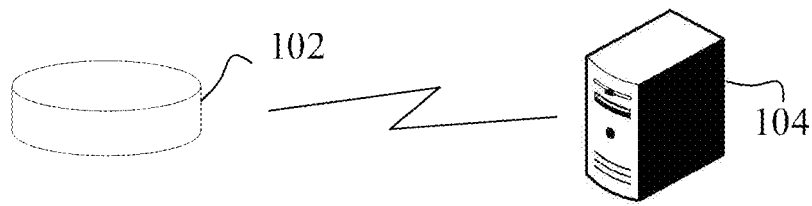
FIG. 1 is a diagram of an implementation environment of a method for generating a robot exploration path provided by an embodiment of the present disclosure.

The method for generating a robot exploration path provided by the present disclosure may be applied to the application environment as shown in FIG. 1. A terminal 102 communicates with a server 104 via a network. The terminal 102 may be, but not limited to, various mobile robots. The mobile robot may include an odometer, a gyroscope, a lidar, a vision sensor, a drive system, and a core control board. Specifically, the drive system in this embodiment is composed of a right wheel and a left wheel which are driven by different motors. It can be understood that the mobile robot may further include other parts (such as a dust collection system, a sensor system, an alarm system, and the like), and the server 104 can be implemented as an independent server or a server cluster composed of a plurality of servers.

Figure 2:
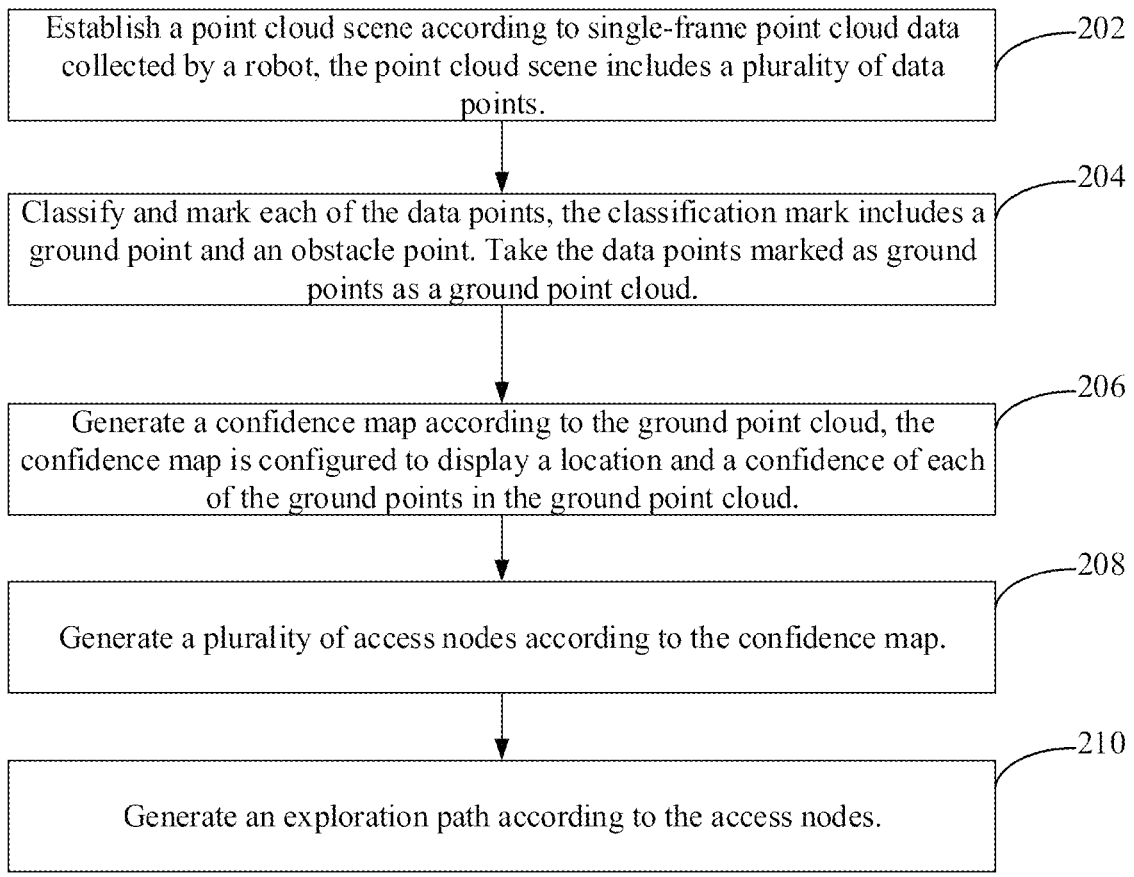
FIG. 2 is a flow chart of a method for generating a robot exploration path provided by an embodiment of the present disclosure.

Please refer to FIG. 2, which shows a method for generating a robot exploration path provided by this embodiment. Taking the method being applied to the terminal in FIG. 1 as an example for description, the method includes the following steps:

Step 202: Establish a point cloud scene according to single-frame point cloud data collected by a robot, the point cloud scene includes a plurality of data points.

In an embodiment of the present disclosure, the robot is equipped with a lidar, through which laser point cloud data of the current environment can be collected in real time. The laser point cloud data saves relative coordinates from the data point to the lidar of the robot. Therefore, the laser point cloud data acquired by the robot through the lidar at each moment is taken as the single-frame scan data. The single-frame scan data contains laser point cloud data in a coordinate system of the current location and instant posture of the robot. The laser point cloud data can display the complete geometric surface of the scanned environment with points representing surfaces.

In an embodiment of the present disclosure, the robot collects single-frame point cloud data at each moment in the moving track and accumulates them in a global coordinate system, and the plurality of data points accumulated in the global coordinate system i the established point cloud scene. The point cloud scene accumulates data points in single-frame point cloud data at each moment. As the robot continues to move, the point cloud scene will continue to update, that is, new single-frame point cloud data will be added into the point cloud scene.

Step 204: Classify and mark each of the data points, the classification mark includes a ground point and an obstacle point. Take the data points marked as ground points as a ground point cloud.

In an embodiment of the present disclosure, the plurality of data points in the point cloud scene are classified into ground points and obstacle points, a point set formed by a plurality of ground points obtained after the classification is taken as a ground point cloud. The ground point cloud represents an area where the robot can reach. It should be noted that, the area where the robot can reach is not a location where the robot must go to, but only means that the robot has the ability to reach the area, which belongs to a travelable area. The other data points that are not ground points in the point cloud scene are taken as obstacle points, and form an obstacle point cloud. The obstacle point cloud represents an area where the robot cannot reach such as stairs and walls, which belongs to a non-travelable area.

Step 206: Generate a confidence map according to the ground point cloud, the confidence map is configured to display a location and a confidence of each of the ground points in the ground point cloud.

In an embodiment of the present disclosure, for each of the ground points in the ground point cloud, the confidence of this ground point is calculated according to a distance feature, an edge feature, and a visibility feature of this ground point. The distance feature measures a distance from a target area to the robot, the edge feature measures a distance from an obstacle to the robot, the visibility feature measures a possibility of an unknown area, and a confidence finally obtained is used to represent a degree to which a corresponding ground point needs to be explored. In the confidence map, each of the ground points contains the corresponding location of the ground point and the corresponding confidence. According to the magnitude of the confidence, the confidence value of each of the ground points in the confidence map presents a state of high and low distribution.

In an embodiment of the present disclosure, a purpose of the confidence value is to represent the area that the robot should explore on the map. The confidence value of a data point is continuously updated every time the data point is included in the calculation range of the robot until the data point is out of the calculation range of the robot.

Step 208: Generate a plurality of access nodes according to the confidence map.

In an embodiment of the present disclosure, since the values of the confidence in the confidence map assumes a distribution state of high and low values at locations of various ground points, a local extreme point of the confidences in the confidence map can be used as an access node, and a local extreme point in each sub-area is calculated such that a plurality of access nodes are obtained, and the access node indicates a place in a local area that the robot should explore most.

Step 210: Generate an exploration path according to the access nodes.

In an embodiment of the present disclosure, after obtaining the plurality of access nodes, a certain exploration sequence needs to be planned to traverse the plurality of access nodes. Optionally, an optimal exploration path is obtained by inputting the location coordinates of the plurality of access nodes into a traveling salesman problem algorithm and solving it. Optionally, an optimal exploration path is obtained by setting different exploration weights for each of the access nodes, and inputting the location coordinates of each of the access nodes and the corresponding exploration weights into an orienteering problem algorithm and solve it.

In the method for generating a robot exploration path provided by the embodiment of the present disclosure, a point cloud scene is established according to single-frame point cloud data collected by the robot, the point cloud scene includes a plurality of data points; each of the data points is classified and marked, the classification mark includes a ground point and an obstacle point, and the respective data points marked as ground points are taken as a ground point cloud; a confidence map is generated according to the ground point cloud, the confidence map is configured to display a location and a confidence of each of the ground points in the ground point cloud; a plurality of access nodes is generated according to the confidence map; and a exploration path is generated according to the access nodes. According to the method for generating a robot exploration path provided by the embodiment of the present disclosure, a point cloud scene is established through the collected single-frame point cloud data, and the confidence of the ground point cloud obtained by the classification in the point cloud scene is calculated, and the confidence map is drawn, the access nodes are acquired through the confidence map and a exploration path is generated. Therefore, the point cloud scene is continuously updated by way of collecting and accumulating single-frame point cloud data, so that the ground point cloud, the confidence map, the access nodes, and the exploration path obtained in this disclosure will be updated in real time. The robot is driven to a current under-scanned area, so that the scanning quality and scanning efficiency can be improved. And, by drawing the confidence map to determine the exploration path, it can adapt to an unknown environment of open and narrow joint distribution, and improve the adaptability of the exploration path to unknown environment.

Figure 3:
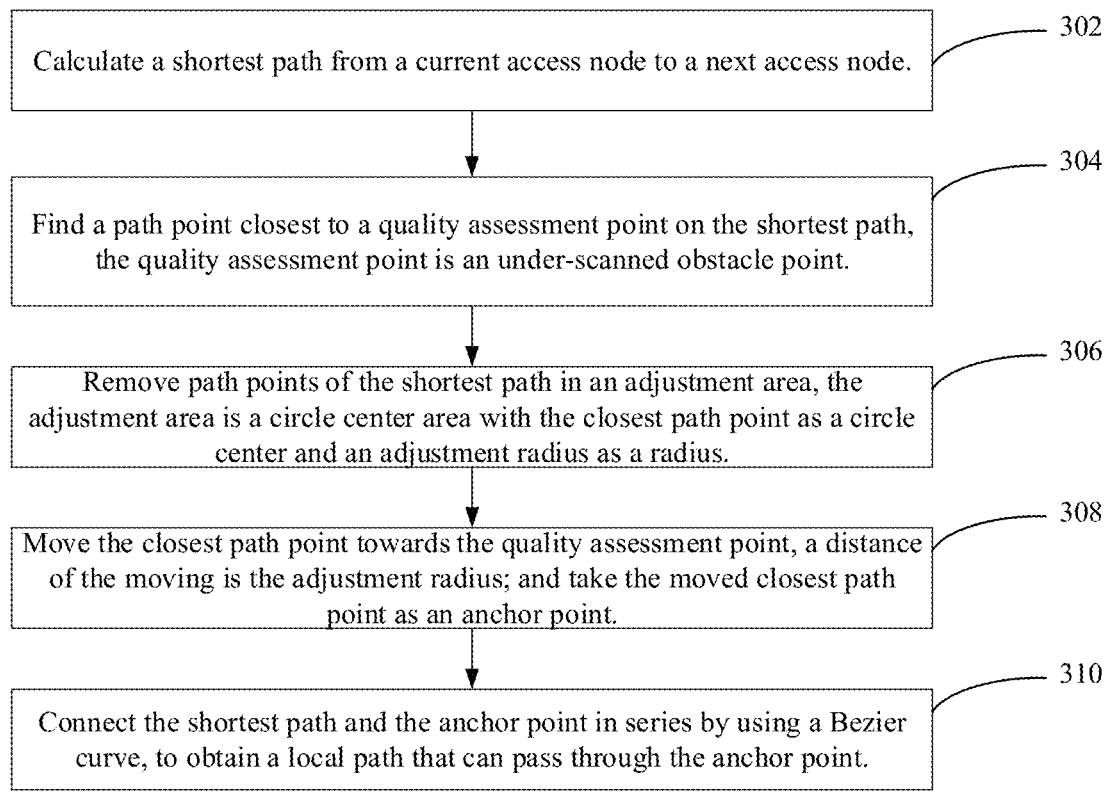
FIG. 3 is a flow chart of another method for generating a robot exploration path provided by an embodiment of the present disclosure.

The generated exploration path includes the traversal sequence of each of the access nodes. In the local path from the current access node to the next access node, the robot can be driven to approach the under-scanned area to improve the scanning quality and scanning efficiency. Therefore, please refer to FIG. 3, which shows a flowchart of another method for generating a robot exploration path provided by this embodiment. The method for generating a robot exploration path may be applied to the terminal 102 in the implementation environment described above. Based on the embodiment shown in FIG. 2, the method may further include the following steps:

Step 302: Calculate a shortest path from a current access node to a next access node.

In an embodiment of the present disclosure, a local shortest path with the current access node as a starting point and the next access node as an end point can be obtained according to the location coordinate of the currently access node and the location coordinate of the next access node through one of the shortest path algorithms such as Dijkstra algorithm, Bellman-Ford algorithm, SPFA algorithm, Floyd algorithm, A* algorithm, and the like. The shortest path contains a plurality of path points for representing the distribution of the shortest path.

Step 304: Find a path point closest to a quality assessment point on the shortest path, the quality assessment point is an under-scanned obstacle point.

In an embodiment of the present disclosure, a plurality of obstacle points on two sides of the shortest path are acquired, an under-scanned obstacle point is extracted from the plurality of obstacle points as a quality evaluation point, and a path point closest to the quality assessment point is determined from the path points included in the local shortest path.

Step 306: Remove path points of the shortest path in an adjustment area, the adjustment area is a circle center area with the closest path point as a circle center and an adjustment radius as a radius.

In an embodiment of the present disclosure, the adjustment area is set by taking the obtained path point closest to the quality evaluation point as the circle center and taking the adjustment radius as the radius, and the path points in the adjustment area are removed. Specifically, the adjustment radius can be defined by the user. The larger the value of the adjustment radius, the smoother the final path will be obtained, but the path length will also be increased.

Step 308: Move the closest path point towards the quality assessment point, a distance of the moving is the adjustment radius; and take the moved closest path point as an anchor point.

Step 310: Connect the shortest path and the anchor point in series by using a Bezier curve, to obtain a local path that can pass through the anchor point.

In an embodiment of the present disclosure, the obtained path point closest to the quality evaluation point is taken as the starting point, the path point is moved in the direction towards the quality evaluation point by the distance of the adjustment radius, and the point obtained after the movement is used as the anchor point.

In an embodiment of the present disclosure, two intermediate breakpoints in the shortest path after removing a path point are acquired, and the two intermediate breakpoints are connected in series with the anchor point by using the Bezier curve, so that a local path that can pass through the anchor point can be obtained. The previous local shortest path is replaced with the processed local path, so that the robot starts from the current access node and moves to the next access node according to the processed local path. During the movement, due to the existence of the anchor point, the robot can be caused to shift toward the quality assessment point.

Figures 4A, 4B:
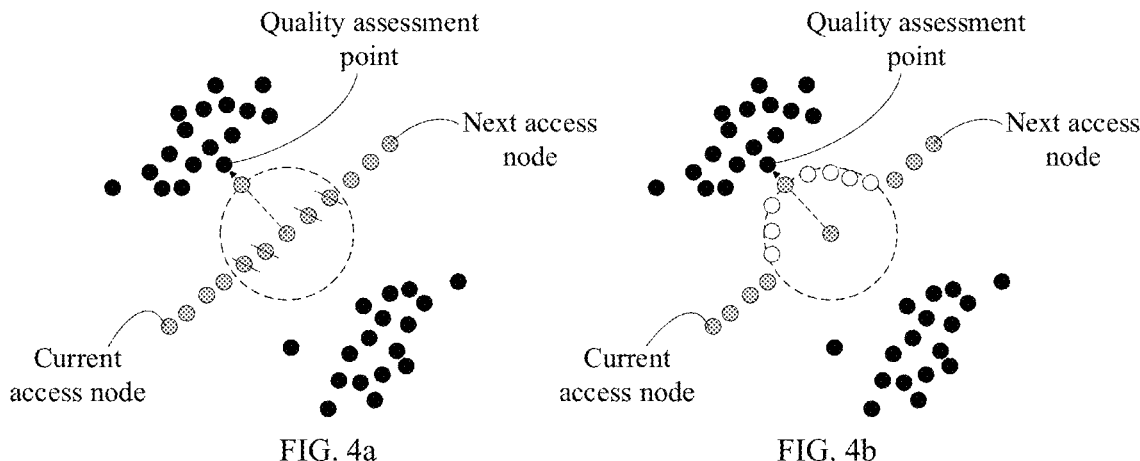
FIGS. 4*a*-4*b* are schematic diagrams of local paths provided by an embodiment of the present disclosure.

As shown in the schematic diagram in FIG. 4a, the black points are obstacle points, and the gray points are local path points from the current access node to the next access node. There is a quality assessment point. First, a local path point having a shortest distance from the quality assessment point is searched. Path points within a preset adjustment range are removed, and the closest path point is moved in a direction towards the quality assessment point by the distance of the adjustment radius to obtain an anchor point. The shortest path is connected in series with the anchor point by using a Bezier curve to obtain a local path that can pass through the anchor point as shown in FIG. 4b. The white path points are new local path points established through the Bezier curve.

According to the method for generating a robot exploration path provided by the embodiment of the present disclosure, by setting the anchor points, the local path of the robot from the current access node to the next access node can be biased towards the quality assessment point, so that the robot can further scan the data points around the quality assessment point, thereby improving the scanning efficiency and the scanning quality.

Figure 5:
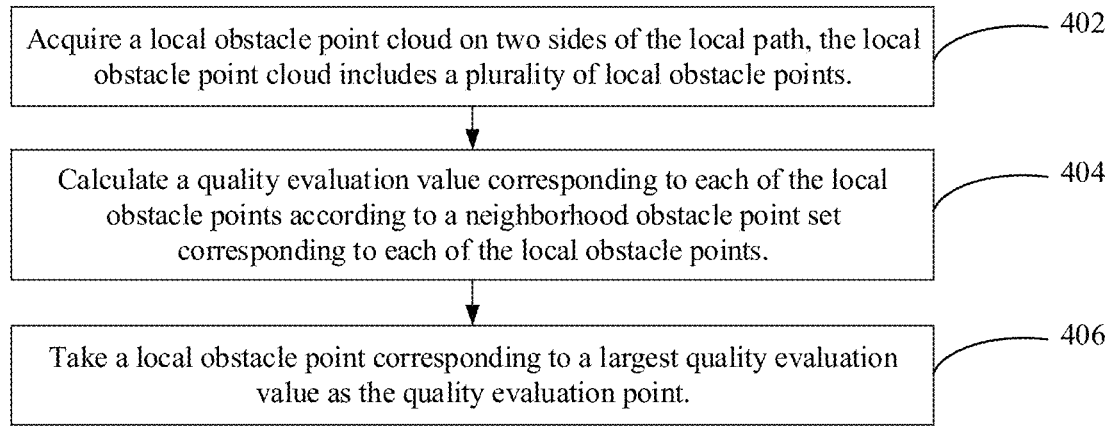
FIG. 5 is a flow chart of another method for generating a robot exploration path provided by an embodiment of the present disclosure.

There are many targets in the outdoor environment, the surface structure of the objects is complex, and the obstruction between the objects is serious. These factors bring great challenges to the integrity of laser scanning. In addition, the laser itself is a line scan, and a large number of data points will be generated near the scan line, and these data points will cause the uneven distribution of the point cloud and invalidate the conventional operators such as density, variance, and the like. Therefore, please refer to FIG. 5, which shows a flowchart of another method for generating a robot exploration path provided by this embodiment. The method for generating a robot exploration path may be applied to the terminal 102 in the implementation environment described above. Based on the embodiment shown in FIG. 3, the method may further include the following steps:

Step 402: Acquire a local obstacle point cloud on two sides of the local path, the local obstacle point cloud includes a plurality of local obstacle points.

In an embodiment of the present disclosure, according to a location of the shortest local path, the obstacle points on two sides of the shortest local path are acquired, and a local obstacle point cloud is formed. The local obstacle point cloud is used to represent an obstacle point set that can be further scanned by way of path offset in the moving path from the current access node to the next access node of the robot.

Step 404: Calculate a quality evaluation value corresponding to each of the local obstacle points according to a neighborhood obstacle point set corresponding to each of the local obstacle points.

In an embodiment of the present disclosure, a corresponding quality evaluation value needs to be calculated for each of the local obstacle points. Specifically, a dimension value of each of the local obstacle points may be calculated by using a Hausdorff dimension method or a box-counting dimension and taken as the corresponding quality evaluation value.

Specifically, for each of the local obstacle points, a neighborhood obstacle point set formed within a range of radius R of this local obstacle point is acquired, and then a value of this point set is calculated by a dimensionality estimation method as the quality evaluation value of this local obstacle point. For a neighborhood obstacle point set $O_{i,R}$ of a local obstacle point $O_i$, an evaluation equation $f_q(O_i,R)$ herein is:

$$f_q(o_i,R) = |Dim(O_{i,R}) - 2|$$

$Dim(O_{i,R})$ is an estimated value of a dimensionality of the local obstacle point $O_i$. For any three-dimensional point set P, the estimated value $Dim(P)$ of its dimensionality is:

$$Dim(P) = \lim_{d \to d_g^+} \frac{\partial \log(N(P, d))}{\partial \log(d)}$$

N(P,d) is the number of non-empty voxels at the scale d. In the actual operation, log(d) is taken as an input, and log (N(P,d)) is taken as an output, and a gradient value is obtained by fitting a straight line with a least square method. For any point set, when d→0, Dim(P)=0, that is, the dimension of the point set is zero. However, the shape of the point cloud itself assumes the surfaces of a geometric object, for any continuous standard two-dimensional surface, it can be obtained that Dim(P)=2, and most of the surfaces of the semantic targets in the outdoor environment are also regular surfaces, such as the ground surfaces, road surfaces, and building facades. Based on this, we assume that at a given scale, the point cloud assumes a continuous and smooth two-dimensional surface of the scanned object, so it is taken that d→$d_g$. $d_g$ depends on a gap width between two points of the laser scanner itself, that is, it is reasonable that the surface of the point cloud is regarded as a smooth continuous manifold surface at this scale. For an under-scanned object point cloud set, its dimensionality estimation result has a smaller dimensionality estimation value, and for a complete object surface, its dimensionality estimation result is close to 2.

In an embodiment of the present disclosure, the obstacle points corresponding to $f_q(O_i,R) < 1.0$ are eliminated to avoid the interference of discrete points.

Step 406: Take a local obstacle point corresponding to a largest quality evaluation value as the quality evaluation point.

In an embodiment of the present disclosure, the local obstacle points are arranged from large to small according to the obtained quality evaluation value corresponding to each of the local obstacle points, and the local obstacle point having the largest quality evaluation value is taken as the quality evaluation point.

According to the method for generating a robot exploration path provided by the embodiments of the present disclosure, by calculating the dimensional estimation value of the neighborhood obstacle point set corresponding to each of the local obstacle points in the local obstacle point cloud, the scanning integrity of the area corresponding to the each of the local obstacle points can be reflected reasonably, and the obstacle points having the worst scanning integrity can be further scanned, thereby improving the scanning quality.

Figure 6:
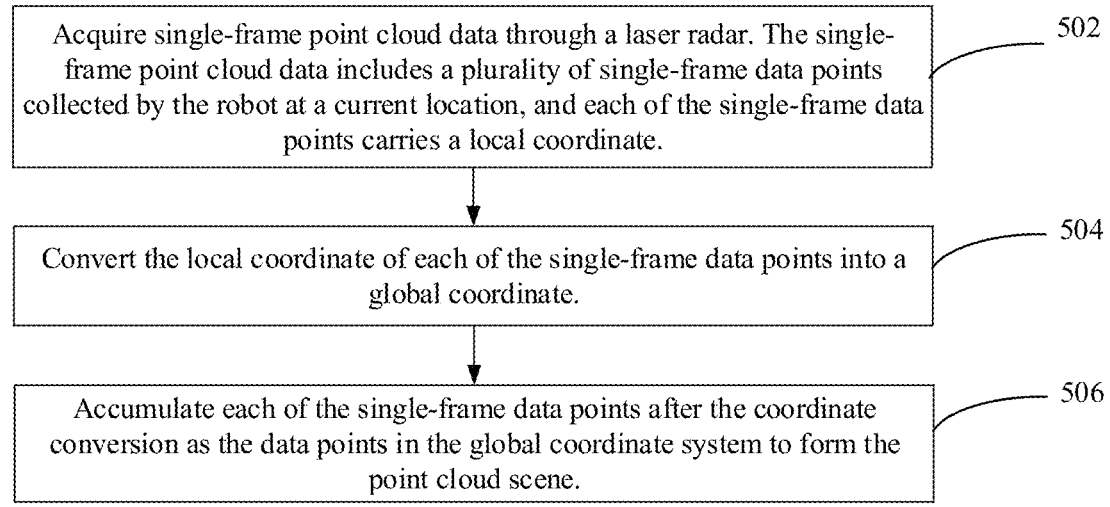
FIG. 6 is a flow chart of another method for generating a robot exploration path provided by an embodiment of the present disclosure.

Please refer to FIG. 6, which shows a flowchart of another method for generating a robot exploration path provided by this embodiment. The method for generating a robot exploration path may be applied to the terminal 102 in the implementation environment described above. Based on the embodiment shown in FIG. 2 above, the above step 202 may specifically include the following steps:

Step 502: Acquire single-frame point cloud data through a lidar. The single-frame point cloud data includes a plurality of single-frame data points collected by the robot at a current location, and each of the single-frame data points carries a local coordinate.

In an embodiment of the present disclosure, the laser point cloud data of the current environment collected by the robot at each moment is taken as single-frame point cloud data. For the laser point cloud data collected at each moment, the laser point cloud data can display the complete geometric surface of the scanned environment with points representing surfaces, but what is saved by the single-frame data of the lidar is a relative coordinate from the data point to the laser scanner. That is, the position coordinate carried in each obtained single-frame data point is based on a local coordinate system under an instantaneous posture of the robot at a current moment. During the movement of the robot, the local coordinate systems corresponding to the plurality of single-frame point cloud data may be all different.

Figure 7A:
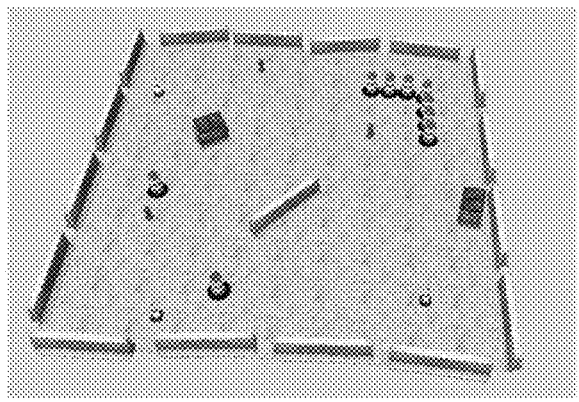
FIGS. 7*a*-7*c* are schematic diagrams of a scenario provided by an embodiment of the present disclosure.
Figure 7B:
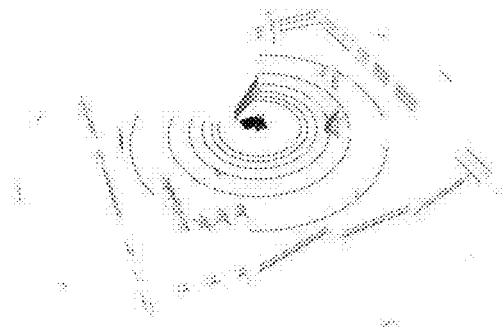

For example, FIG. 7a is a schematic diagram of the current environment. The robot scans the current environment once through lidar to obtain a scan result as shown in FIG. 7b, the scan result is the single-frame point cloud data at the current time and the current location.

Step 504: Convert the local coordinate of each of the single-frame data points into a global coordinate.

In an embodiment of the present disclosure, in order to accumulate the single-frame point cloud data based on a local coordinate system obtained at each moment in a global coordinate system to establish a point cloud scene, it is necessary to convert the point cloud coordinate value in the local coordinate system to the point cloud coordinate value in the global coordinate system based on the current instantaneous posture of the robot itself when acquiring the single-frame point cloud data.

Optionally, an integrated navigation system is used to perform the above conversion of coordinates, that is, a global coordinate conversion system is constructed through GPS (Global Positioning System) global positioning device and IMU (Inertial Measurement Unit) inertial measurement unit device, to convert the point cloud coordinate value under the local coordinate system into the point cloud coordinate value under the global coordinate in real time.

Optionally, a Simultaneous Localization and Mapping (SLAM) real-time positioning and mapping technology is used for the construction of the point cloud map. Specifically, a Lidar Odometry and Mapping (LOAM) method is adopted in the present disclosure. The calculation frequency of this method is 10 Hz, for single-frame point cloud data, the curvature value is used to calculate the features such as the smooth points and corner points of the single-frame point cloud data, and then a frame-by-frame registration is performed. At the same time as the registration, the generated map is used to adjust the error of the registration to rotate the point cloud posture to a global correct location.

Step 506: Accumulate each of the single-frame data points after the coordinate conversion as the data points in the global coordinate system to form the point cloud scene.

Figure 7C:
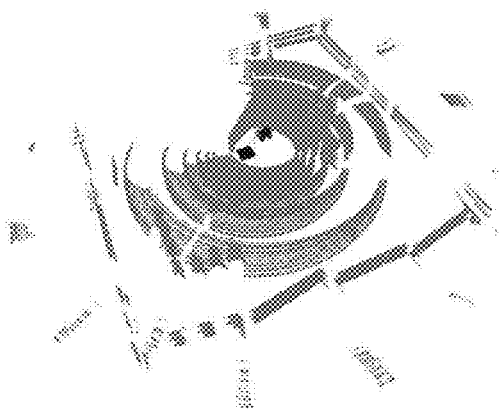

In an embodiment of the present disclosure, whenever single-frame point cloud data is collected by the robot when it moves to a next location, or single-frame point cloud data is collected by the robot at a next moment, each of the single-frame data points in the acquired single-frame point cloud data is converted to a data point in the global coordinate system according to the above coordinate conversion method, and accumulated in the obtained point cloud scene, and forms an updated point cloud scene together with the plurality of data points in the previous point cloud scene. For example, after coordinate conversion and accumulation of a plurality of single-frame point cloud data in the global coordinate system, a point cloud scene as shown in FIG. 7c can be obtained.

According to the method for generating a robot exploration path provided by the embodiments of the present disclosure, by calculating the dimensional estimation value of the neighborhood obstacle point set corresponding to each of the local obstacle points in the local obstacle point cloud, the scanning integrity of the area corresponding to the each of the local obstacle points can be reflected reasonably, and the obstacle points having the worst scanning integrity can be further scanned, thereby improving the scanning quality.

Figure 8:
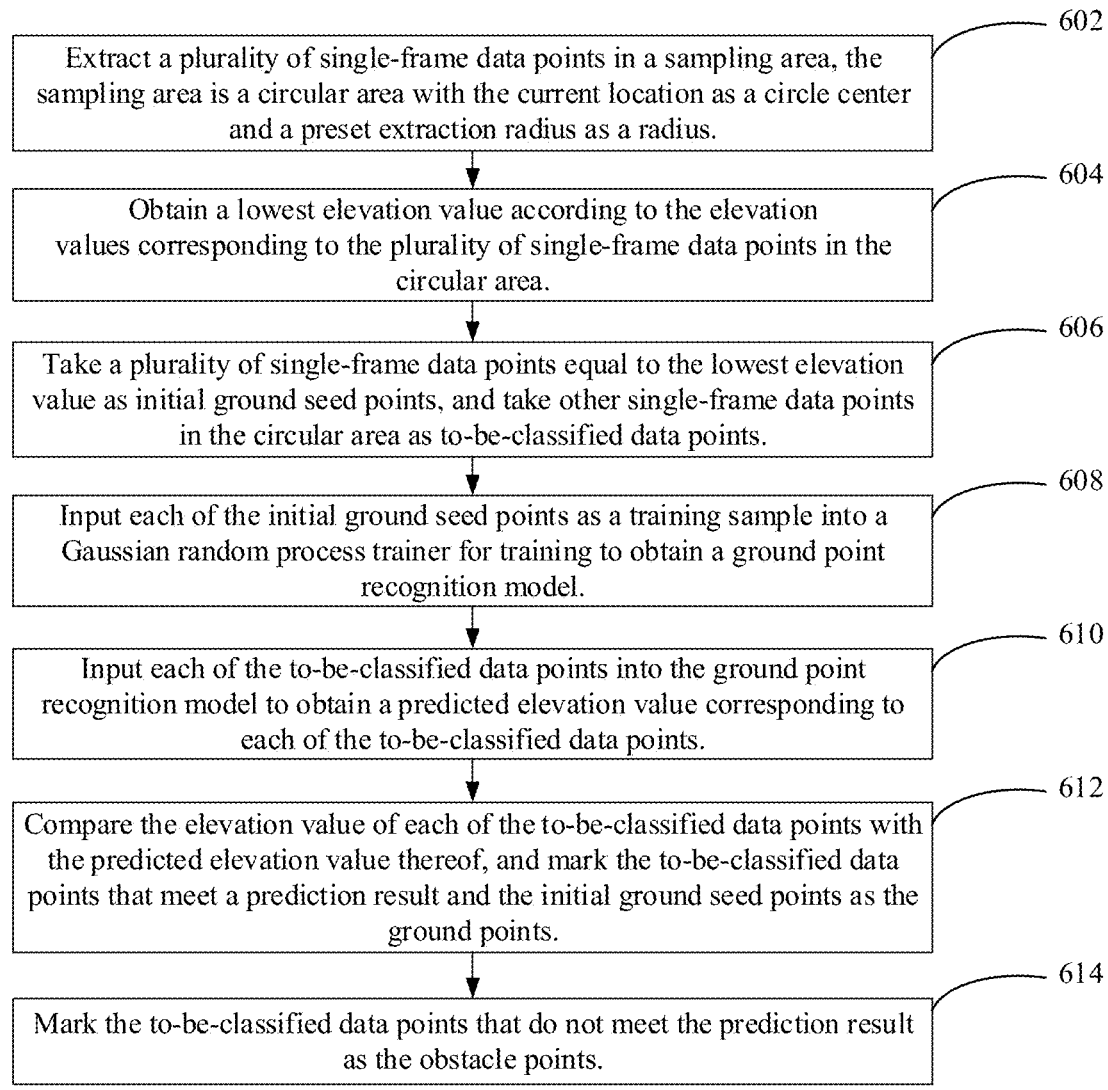
FIG. 8 is a flow chart of another method for generating a robot exploration path provided by an embodiment of the present disclosure.

Please refer to FIG. 8, which shows a flowchart of another method for generating a robot exploration path provided by this embodiment. The method for generating a robot exploration path may be applied to the terminal 102 in the implementation environment described above. Based on the embodiment shown in FIG. 6 above, each of the single-frame data points further carries an elevation value, and the above step 204 may specifically include the following steps:

Step 602: Extract a plurality of single-frame data points in a sampling area, the sampling area is a circular area with the current location as a circle center and a preset extraction radius as a radius.

Step 604: Obtain a lowest elevation value according to the elevation values corresponding to the plurality of single-frame data points in the circular area.

Step 606: Take a plurality of single-frame data points equal to the lowest elevation value as initial ground seed points, and take other single-frame data points in the circular area as to-be-classified data points.

In an embodiment of the present disclosure, for the plurality of single-frame data points in a single-frame point cloud data, it is necessary to first determine a part of the single-frame data points as ground seed points, and take the determined plurality of ground seed points as the standard to determine the classification categories of other single-frame data points. Specifically, a plurality of single-frame data points can be extracted from within a circular area with the current location as a circle center and with a preset extraction radius of 3.5 meters. An elevation value corresponding to each of the single-frame data points in the circular area is determined according to the location coordinate of each of the single-frame data points in the global coordinate system, and a lowest elevation value is obtained. A plurality of single-frame data points in the circular area equal to the lowest elevation value are taken as initial ground seed points, and other single-frame data points in the circular area are taken as to-be-classified data points. The elevation value is used to represent the height of the data point in the global coordinate system. Optionally, a plurality of single-frame data points, differences between which and the lowest elevation value are within a certain range, may be taken as initial ground seed points.

Step 608: Input each of the initial ground seed points as a training sample into a Gaussian random process trainer for training to obtain a ground point recognition model. The ground point recognition model is configured to predict an elevation value of an input data point according to a distance between the input data point and the current location.

In an embodiment of the present disclosure, the Gaussian random process trainer is trained by using each initial ground seed point as a training sample, and the ground point recognition model reflects the mapping relationship between the distance between the ground seed point and the robot and the elevation value. That is, if a single-frame data point is input into the ground recognition model, a predicted elevation value can be obtained, and the predicted elevation value reflects the elevation value when the single-frame data point is a ground point.

Step 610: Input each of the to-be-classified data points into the ground point recognition model to obtain a predicted elevation value corresponding to each of the to-be-classified data points.

Step 612: Compare the elevation value of each of the to-be-classified data points with the predicted elevation value thereof, and mark the to-be-classified data points that meet a prediction result and the initial ground seed points as the ground points.

Step 614: Mark the to-be-classified data points that do not meet the prediction result as the obstacle points.

Figure 9:
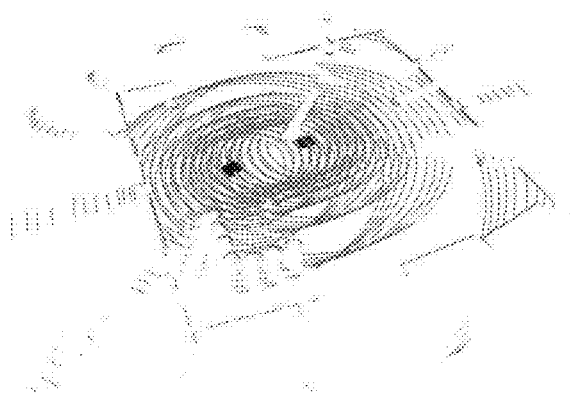
FIG. 9 is a schematic diagram of a ground point cloud provided by an embodiment of the present disclosure.

In an embodiment of the present disclosure, each of the remaining to-be-classified data points is inputted into the ground point recognition model, that is, a predicted elevation value of each of the to-be-classified data points, if this to-be-classified data point is a ground point, is acquired through the distance between each of the to-be-classified data points and the robot. By comparing the elevation value of each of the to-be-classified data points with the predicted elevation value thereof, it can be learned that, a to-be-classified data point having a same comparison result is a ground point, and a to-be-classified data point having a different comparison result is an obstacle point. After classifying each of the single-frame data points, the ground point cloud in the point cloud scene can be obtained. For example, for the point cloud scene of FIG. 7c, after classification and recognition, the ground point cloud shown in FIG. 9 can be obtained.

In an embodiment of the present disclosure, when comparing the elevation value of each to-be-classified data point with the predicted elevation value thereof, when the difference between the two is within a certain range, the comparison result is determined to be same. Otherwise, the comparison result is determined to be different.

According to the method for generating a robot exploration path provided by the embodiments of the present disclosure, by setting ground seed points as training samples, a ground point recognition model that can reflect the current scene is obtained. Through the ground point recognition model, the single-frame data points can be accurately classified into the ground points and the obstacle points, and more accurate and complete ground point cloud and confidence map can be further formed, which also improves the rationality and accuracy of the exploration path.

Figure 10:
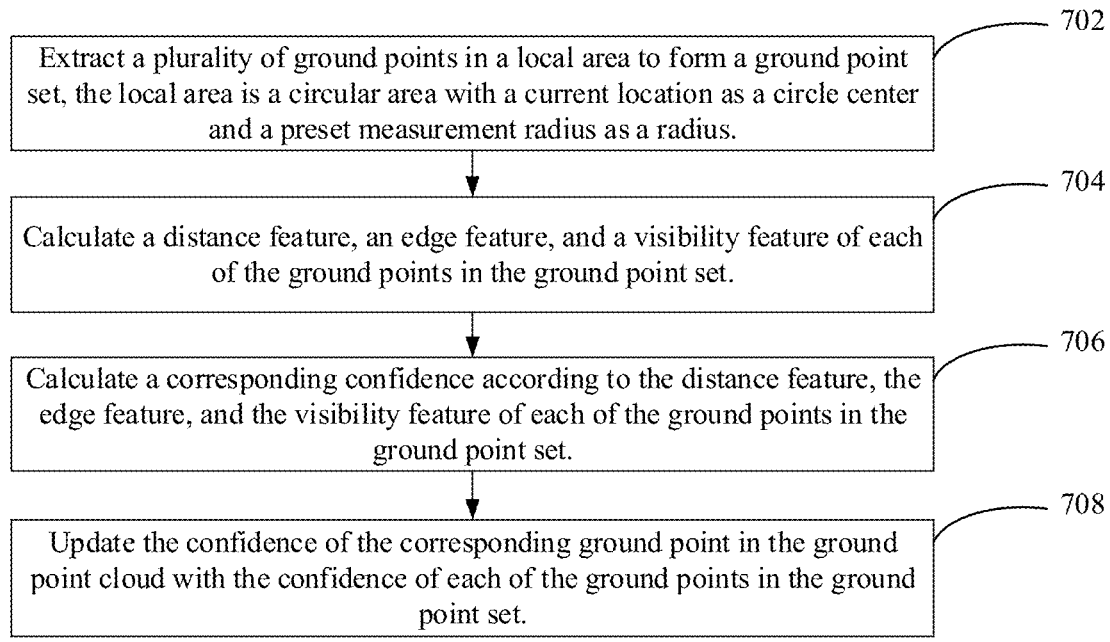
FIG. 10 is a flow chart of another method for generating a robot exploration path provided by an embodiment of the present disclosure.

Please refer to FIG. 10, which shows a flowchart of another method for generating a robot exploration path provided by this embodiment. The method for generating a robot exploration path may be applied to the terminal 102 in the implementation environment described above. Based on the embodiment shown in FIG. 2 above, the above step 206 may specifically include the following steps:

Step 702: Extract a plurality of ground points in a local area to form a ground point set, the local area is a circular area with a current location as a circle center and a preset measurement radius as a radius.

In an embodiment of the present disclosure, in order to avoid massive data involving the point cloud scene, the calculations of the confidence map are based on the current location of the robot, and each calculation only considers the point cloud information within a certain range of the location of the robot. Therefore, it is necessary to select ground points within a certain range in the ground point cloud based on the robot to form a ground point set, and take the ground point set as a calculation range of the confidence map. Specifically, the calculation range is a circular area with a current location as a circle center and a preset measurement radius as a radius.

Step 704: Calculate a distance feature, an edge feature, and a visibility feature of each of the ground points in the ground point set.

Step 706: Calculate a corresponding confidence according to the distance feature, the edge feature, and the visibility feature of each of the ground points in the ground point set.

In an embodiment of the present disclosure, the calculation range is set according to the ground point set, and the distance feature, the edge feature, and the visibility feature of each of the ground points are calculated according to the calculation range. The distance feature measures the distance between each of the ground points and the robot, the edge feature measures the distance between each of the ground points and the obstacle, and the visibility feature measures the possibility that each of the ground points is an unknown area. In the present disclosure, the confidence value of each of the ground points in the ground point set is constituted through simultaneously combining these three features.

Step 708: Update the confidence of the corresponding ground point in the ground point cloud with the confidence of each of the ground points in the ground point set.

In an embodiment of the present disclosure, whenever the robot travels to the current location, and the confidence of each of the ground points in the corresponding ground point set at the current location is calculated and obtained, for one of the ground points, if this ground point has been calculated with a confidence based on another location before, then a higher confidence will be determined based on the historical confidence and the confidence of the current location as the confidence of this ground point.

According to the method for generating a robot exploration path provided by the embodiments of the present disclosure, by setting the local calculation range, the distance features, edge features, and visibility features of the ground points in the calculation range are obtained, and the confidence of each of the ground points is obtained, the extent to which each of the ground points needs to be explored can be more accurately reflected and, based on local calculations and continuously updating the confidence of the ground points, the extent to which each of the ground points needs to be explored in real time can be reflected, and a confidence map and an exploration path can be further established for the latest confidence, which improves the rationality and accuracy of the exploration path.

An embodiment of the present disclosure further provides another method for generating a robot exploration path. The method for generating a robot exploration path may be applied to the terminal 102 in the implementation environment described above. Based on the above embodiment shown in FIG. 10, the above step 704 may specifically include the following steps:

Determine a distance feature of each of the ground points according to a relative distance between each of the ground points in the ground point set and the current location.

In an embodiment of the present disclosure, suppose that the ground point set obtained in a single scan is point set G, and if there is $g_i \in G$, $g_i = [x_i, y_i, z_i]^T$, then for each ground point $g_i$, the value of its distance feature $d(g_i)$ is as shown in the following equation:

$$d(g_i) = e^{-\frac{\|g_i - g_r\|^2}{\sigma^2}}$$

$\|\cdot\|$ is the modulus operation, the location of the robot is $g_r$, $\|g_i - g_r\|$ is the Euclidean distance from the robot to the ground point, so the equation is substantially the result of the distance value weighted by the Gaussian kernel, and the parameter a controls the influence range of the kernel function, and its value is the preset measurement radius of the robot. If a ground point is far away from the current location of the robot, a lower distance feature will be obtained, while a higher distance feature will be obtained for a ground point closer to the robot.

An embodiment of the present disclosure further provides another method for generating a robot exploration path. The method for generating a robot exploration path may be applied to the terminal 102 in the implementation environment described above. Based on the embodiment shown in FIG. 10 above, the above step 704 may specifically include the following steps:

Extract a plurality of obstacle points in the local area to form an obstacle point set.

Determine an edge feature of each of the ground points according to a relative distance between each of the ground points in the ground point set and each of the obstacle points in the obstacle point set.

In an embodiment of the present disclosure, the closer an area is to the obstacle and the higher the confidence value, the lower the probability of being the area to be explored, and the robot reaching the edge of the obstacle is more inhibited than reaching a wide area, so as to drive the robot to move in the direction towards the wide area. For the obstacle point set O within the calculation range currently recognized by the robot, there are obstacle points $o_j \in O$. For each ground point $g_i$, the value of the distance feature $b(g_i)$ is defined as the following equation:

$$b(g_i) = 1.0 - \min_{j \in J} \|g_i - o_j\|/\sigma$$

If $b(g_i) < 0$, making $b(g_i) = 0$. In this equation, $\sigma$ is the calculation range of the robot consistent with the distance feature, $\|g_i - o_j\|$ is the shortest distance from the ground point $g_i$ to the obstacle. The shortest distance is obtained by a nearest neighbor search method. The meaning of the value of the shortest distance is to make the robot obtain the repulsive force from a vertical direction of the surface of the obstacle. It can be seen from this equation that within the calculation range of the robot, the ground data point closer to the obstacle has a larger feature value, and therefore has a larger $b(g_i)$ value, which instructs the robot to move away from this location. When $b(g_i) < 0$, it means that this area is located in a wide-open environment and is isotropic in direction, so the neighboring points will have the same feature value.

An embodiment of the present disclosure further provides another method for generating a robot exploration path. The method for generating a robot exploration path may be applied to the terminal 102 in the implementation environment described above. Based on the embodiment shown in FIG. 10 above, the above step 704 may specifically include the following steps:

Extract a plurality of obstacle points in the local area to form an obstacle point set;
take an union set of the ground point set and the obstacle point set as a to-be-observed point set; and
determine a visibility feature of each of the ground points in the to-be-observed point set according to an observation viewpoint and the to-be-observed point set.

In an embodiment of the present disclosure, the point cloud data obtained by the lidar through scanning the ground mainly comes from two situations, one is a new ground contacted during the movement of the laser scanning line, and the other is an old ground that is already in the scanning field of view but has been obstructed by an obstacle and is not exposed until the robot passes through the obstacle. Therefore, this feature is mainly used to distinguish these two situations. For areas where new ground data points are located, higher visibility features should be obtained, indicating that these areas are only conventional exploration areas. For the old ground exposed after being obstructed previously, a lower visibility feature will be obtained, which will show a lower confidence on the map, driving the robot to approach and explore.

In an embodiment of the present disclosure, the present disclosure uses the Generalized Hidden Point Removal (GHPR) algorithm to mark the ground obstructed point cloud. This method requires an observation viewpoint and a to-be-observed point set, and then measures the relationship between objects between the viewpoint and the point set. For any point $p_i$, $p_i \in P$, $P = G \cup O$, G is the ground point set mentioned above and O is the obstacle point set, then the visibility measurement equation is as follows:

$$f(p_i, p_{r,t-n}) = p_i + \frac{p_i - p_{r,t-n}}{\|p_i - p_{r,t-n}\|} h(\|p_i - p_{r,t-n}\|), \; p_i \neq p_{r,t-n}$$

$p_{r,t-n}$ is the observation viewpoint used for calculation. This viewpoint is not the current location $p_{r,t}$ of the robot, but a location of the robot at a certain time in the past, that is, the location $p_{r,t-n}$ of the robot when the time goes backwards by t−n. Therefore, t−n means that the current time t goes backwards by n seconds. For the $h(\|p_i - p_{r,t-n}\|)$ in the equation, the present disclosure uses a linear kernel function:

$$h(\|p_i - p_{r,t-n}\|) = \varepsilon \max_{i \in N}(\|p_i - p_{r,t-n}\|) - \|p_i - p_{r,t-n}\|$$

ε is the amplification factor, which can be larger in outdoor environments. By constructing a convex hull for the transformed point set, the surface points of the convex hull can be obtained, namely, the visibility point set, V, the obstructed point set, $\overline{V}$, there is $V \cup \overline{V} = P$, $V \cap \overline{V} = \emptyset$. Therefore, for the ground visible points, it is easy to obtain that $V_G = V \cap G$, so the visibility can be transformed into a binary result, that is, as the following equation:

$$f_v(g_i) = \begin{cases} 1, & g_i \in V \cap G \\ 0, & g_i \in \overline{V} \cap G \end{cases}$$

It can be seen that the obstructed ground points have lower feature values. For visible ground points, they have higher feature values. While during dynamically moving, the robot will dynamically update the value of the visibility feature in the calculation range, so that the result is consistent with the robot's current visual cognition.

Figure 11:
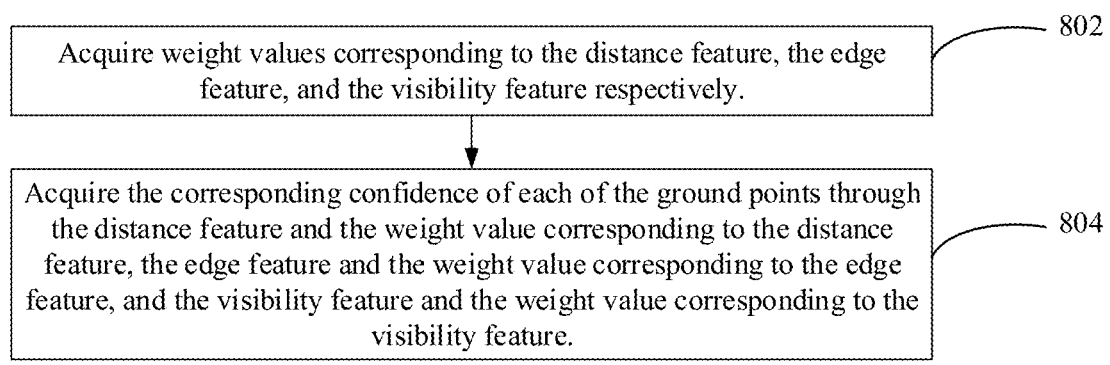
FIG. 11 is a flow chart of another method for generating a robot exploration path provided by an embodiment of the present disclosure.

Please refer to FIG. 11, which shows a flowchart of another method for generating a robot exploration path provided by this embodiment. The method for generating a robot exploration path may be applied to the terminal 102 in the implementation environment described above. Based on the above embodiment shown in FIG. 10, the above step 706 may specifically include the following steps:

Step 802: Acquire weight values corresponding to the distance feature, the edge feature, and the visibility feature respectively.

Step 804: Acquire the corresponding confidence of each of the ground points through the distance feature and the weight value corresponding to the distance feature, the edge feature and the weight value corresponding to the edge feature, and the visibility feature and the weight value corresponding to the visibility feature.

In an embodiment of the present disclosure, for the confidence value of the data point $g_i$ of each drivable area, the following equation is used:

$$f_{con}(g_i) = \omega_v f_v(g_i) + \omega_d d(g_i) + \omega_b b(g_i)$$

$f_{con}(g_i)$ is the confidence value generated by the linear simultaneously combining three feature values, $\omega_v$, $\omega_d$, and $\omega_b$ are the weight values corresponding to the visibility feature, the distance feature, and the edge feature, and there is $\omega_v + \omega_d + \omega_b = 1$.

In an optimal embodiment, $\omega_v = 0.1$, $\omega_d = 0.5$, $\omega_b = 0.4$, the best confidence can be obtained.

According to the method for generating a robot exploration path provided by the embodiment of the present disclosure, the best confidence is obtained by setting corresponding weights for the distance feature, the edge feature, and the visibility feature, which can accurately reflect the extent to which each of the ground points need to be explored, and the confidence map and the exploration path can be established for the latest confidence, thereby improving the reasonability and accuracy of the exploration path.

Figure 12:
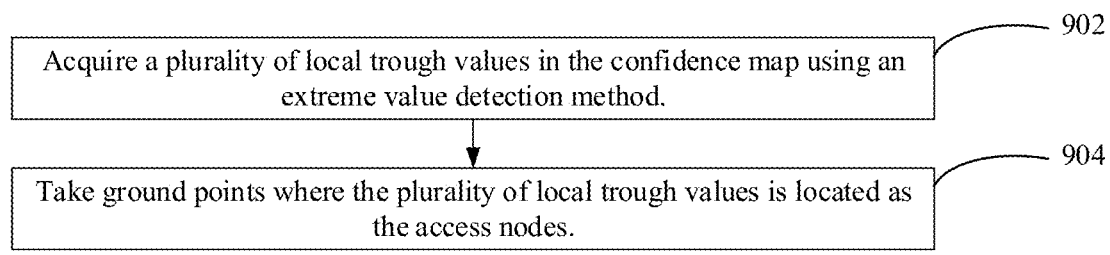
FIG. 12 is a flow chart of another method for generating a robot exploration path provided by an embodiment of the present disclosure.

Please refer to FIG. 12, which shows a flowchart of another method for generating a robot exploration path provided by this embodiment. The method for generating a robot exploration path may be applied to the terminal 102 in the implementation environment described above. Based on the above embodiment shown in FIG. 10, the above step 208 may specifically include the following steps:

Step 902: Acquire a plurality of local trough values in the confidence map using an extreme value detection method.

Step 904: Take ground points where the plurality of local trough values is located as the access nodes.

In an embodiment of the present disclosure, local extreme values in the map are found by the extreme value detection method as the exploration targets, that is, the trough values in the confidence map are found, the equation is:

$$s_g(v_g^r) = \arg\min_{g_i \in G}(f_{con}(g_i))$$

Figures 13A, 13B:
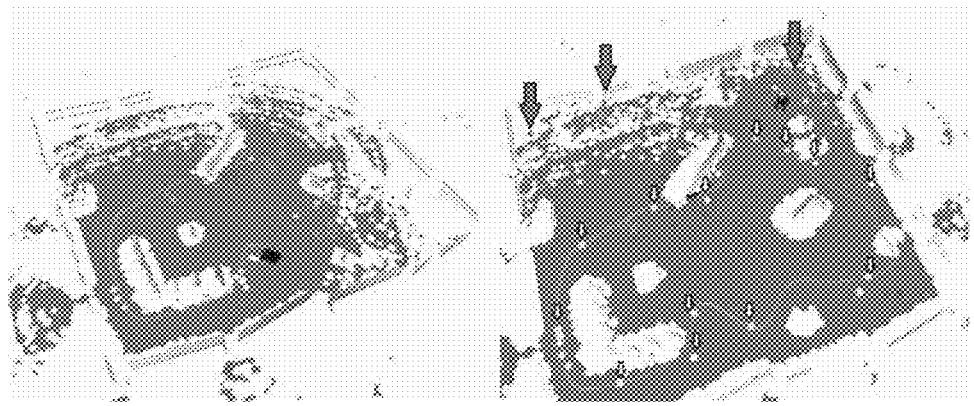
FIGS. 13*a*-13*b* are schematic diagrams of a confidence map provided by an embodiment of the present disclosure.

$s_g$ is a dynamically generated access node, $v_g^r$ is a neighborhood of the ground point $g_i$, and the radius of the neighborhood is r, r=σ/2, that is, the generated node is a ground point corresponding to the minimum confidence located within the radius r. It can be seen that the number of access nodes generated is related to the radius of the neighborhood. For requirements that need to quickly traverse the entire scene, a larger radius of the neighborhood can be used, which will generate fewer access nodes, but a part of potential unexplored areas may also be ignored. For the confidence map generation result shown in FIG. 13a, a plurality of local extreme points in the confidence map can be obtained by the extreme value detection method. As shown in FIG. 13b, a plurality of local extreme points can be displayed in the confidence map.

According to the method for generating a robot exploration path provided by the embodiment of the present disclosure, by acquiring the plurality of local trough values in the confidence map using the extreme value detection method, and taking the corresponding ground points as access nodes, the extent to which each of the ground points needs to be explored can be more accurately reflected, and, based on local calculations and continuously updating the confidence of the ground points, the extent to which each of the ground points need to be explored in real time can be reflected, and a confidence map and an exploration path can be further established for the latest confidence, which improves the rationality and accuracy of the exploration path.

Figure 14:
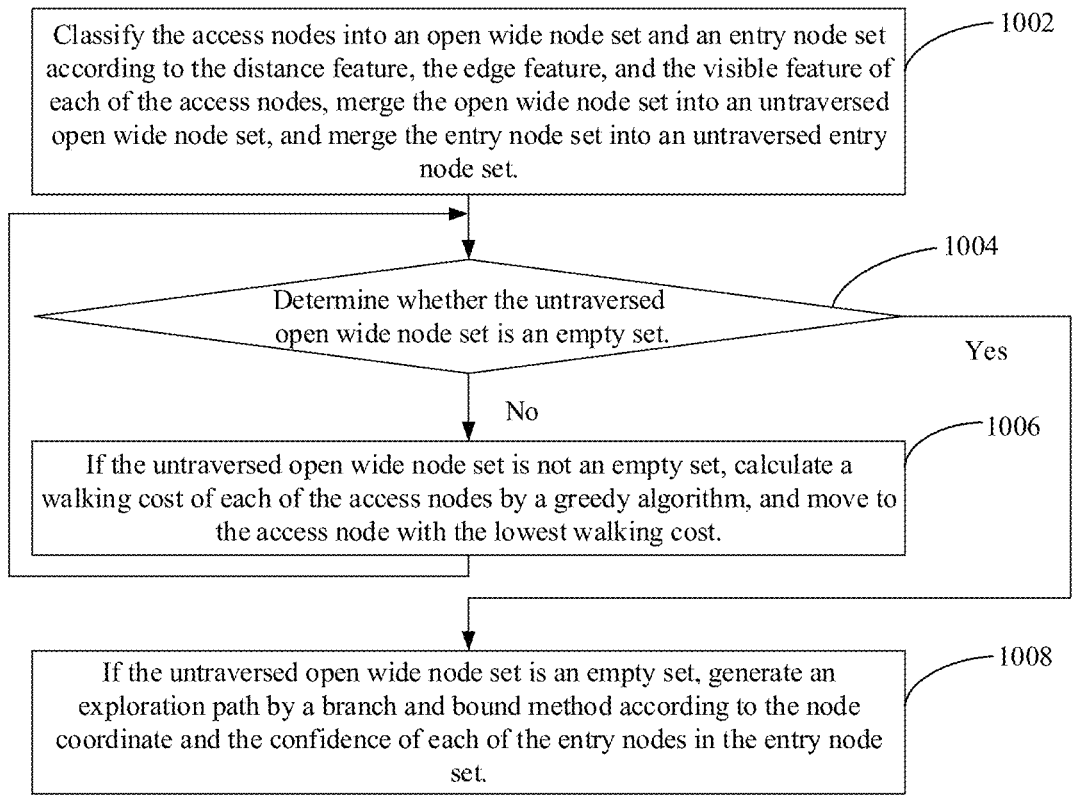
FIG. 14 is a flow chart of another method for generating a robot exploration path provided by an embodiment of the present disclosure.

Please refer to FIG. 14, which shows a flowchart of another method for generating a robot exploration path provided by this embodiment. The method for generating a robot exploration path may be applied to the terminal 102 in the implementation environment described above. Based on the above embodiment shown in FIG. 10, the above step 210 may specifically include the following steps: Step 1002: Classify the access nodes into an open wide node set and an entry node set according to the distance feature, the edge feature, and the visible feature of each of the access nodes, merge the open wide node set into a untraversed open wide node set, and merge the entry node set into a untraversed entry node set.

In an embodiment of the present disclosure, each access node is classified into two categories according to the three features of each access node, namely, the distance feature, the edge feature, and the visible feature. The set of the access nodes S is classified into an open wide node set $S_W$ and an entry node set $S_E$, and there is $S = S_W \cup S_E$. The entry node represents the node located in the narrow and long area of the road entrance, which will have a higher update threshold, so that it is not easy to be updated and canceled during the walking process, and the open wide area node has a lower update threshold and a prioritized access right.

In an embodiment of the present disclosure, among the access nodes, an access node with an edge feature less than 0.2 and a visibility feature equal to 1 can be taken as an entry node, and the remaining access nodes can be taken as open wide nodes. The open wide node set is merged into the untraversed open wide node set, and the entry node set is merged into the untraversed entry node set.

Step 1004: Determine whether the untraversed open wide node set is an empty set.

Step 1006: If the untraversed open wide node set is not an empty set, calculate a walking cost of each of the access nodes by a greedy algorithm, and move to the access node with the lowest walking cost.

Step 1008: If the untraversed open wide node set is an empty set, generate an exploration path by a branch and bound method according to the node coordinate and the confidence of each of the entry nodes in the entry node set.

In an embodiment of the present disclosure, whenever the robot walks to an access node, it updates all the previous access nodes, cancels the access nodes that do not need to be traversed, and at the same time incorporates the new access node into the nodes to be accessed. If there is no open wide node in the nodes to be accessed, then perform path planning by the branch and bound method, and the robot moves along the next best viewpoint in the branch and bound. If there is an open wide node, then calculate all the untraversed nodes by a greedy algorithm, so as to arrive at the nearest node. Repeat the above steps until there is no node to be visited or the cumulative distance of travel exceeds the threshold.

In an embodiment of the present disclosure, when a greedy algorithm is used to calculate all the untraversed nodes, the cost of each of the untraversed nodes needs to be calculated. Suppose that the gain of increasing of the confidence of the untraversed node caused by the robot arriving at the untraversed node is a reward value, and the distance of moving to the untraversed node is a loss value, then and the cost of the untraversed node can be obtained through dividing the loss value by the reward value.

In an embodiment of the present disclosure, an access sequence of the untraversed nodes can be obtained by the branch and bound method according to the coordinate and the confidence of each of the untraversed nodes, and the access sequence is taken as the exploration path.

According to the method for generating a robot exploration path provided by the embodiment of the present disclosure, by classifying the access nodes and firstly accessing the open wide nodes according to the greedy algorithm, and then generating the exploration path for the remaining entry nodes according to the branch and bound method, the open wide area can be quickly expanded, which ensures the completeness of the robot's exploration, and further improves the rationality and accuracy of the exploration path.

It should be understood that although the various steps in the above flowcharts are sequentially displayed as indicated by the arrows, these steps are not necessarily performed in the order indicated by the arrows. Unless clearly stated in the present specification, the execution of these steps is not strictly limited in order, and these steps can be executed in other orders. Moreover, at least part of the steps in the above flowcharts may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

Figure 15:
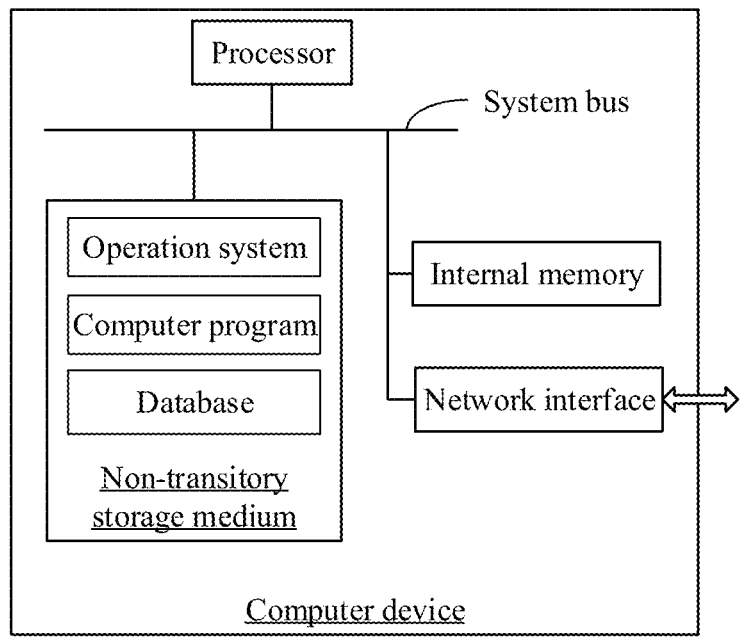
FIG. 15 is a block diagram of a computer device provided by an embodiment of the present disclosure.

In an embodiment, a computer device is provided, this computer device may be a terminal, and its internal structure diagram may be as shown in FIG. 15. The computer device includes a processor, a memory, a network interface, a display screen, and an input device connected by a system bus. The processor of the computer device is configured to provide computing and control capabilities. The memory of the computer device includes a non-transitory storage medium and a Random Access Memory (RAM). The non-transitory storage medium is stored with an operating system and a computer program. The RAM provides a running environment for the operating system and the computer program in the non-transitory storage medium. The network interface of the computer device is configured to communicate with an external terminal via a network connection. When the computer program is executed by the processor, the method for generating a robot exploration path is implemented. The display screen of the computer device may be a liquid crystal display screen or an electronic ink display screen, and the input device of the computer device may be a touch layer covered on the display screen, or may be a button, a trackball, or a touchpad provided on a housing of the computer device, and may also be an external keyboard, touchpad, mouse, or the like.

It will be understood by those skilled in the art that the structure shown in FIG. 15 is only a block diagram of a part of the structure related to the solution of the present disclosure, and does not constitute a limitation of the computer device to which the solution of the present disclosure is applied. The specific computer device may include more or fewer components than those shown in the figure, or combine some components, or have different component arrangements.

In an embodiment, a computer device is provided. The computer device includes a memory and a processor. The memory is stored with a computer program. When the computer program is executed by the processor, the following steps are implemented:

Establishing a point cloud scene according to single-frame point cloud data collected by a robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a plurality of access nodes according to the confidence map; and generating an exploration path according to the access nodes.

In an embodiment, a computer readable storage medium is provided. A computer program is stored on the computer readable storage medium. When the computer program is executed by a processor, the following steps are implemented:

Establishing a point cloud scene according to single-frame point cloud data collected by a robot, the point cloud scene includes a plurality of data points; classifying and marking each of the data points, the classification mark includes a ground point and an obstacle point, and taking the data points marked as ground points as a ground point cloud; generating a confidence map according to the ground point cloud, the confidence map is configured to display a location and a confidence of each of the ground points in the ground point cloud; generating a plurality of access nodes according to the confidence map; and generating an exploration path according to the access nodes.

Those of ordinary skill in the art may understand that all or part of the processes in the method of the above embodiments may be completed by instructing relevant hardware by the computer program, and the computer program may be stored in a non-transitory computer readable storage medium. When the computer program is executed, the processes of the above methods in the embodiments may be included. Any reference to the memory, the storage, the database or other medium used in various embodiments provided in the present disclosure may include a non-transitory memory and/or a transitory memory. A non-transitory memory may include a read only memory (ROM), a programmable ROM (PROM), an electrically programmable ROM (EPROM), an electrically erasable programmable ROM (EEPROM) or a flash memory. A transitory memory may include a random access memory (RAM) or an external cache memory. By way of illustration and not limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above embodiments can be combined arbitrarily. To simplify the description, not all possible combinations of the technical features in the above embodiments are described. However, all of the combinations of these technical features should be considered as within the scope of this disclosure, as long as such combinations do not contradict with each other.

The aforementioned embodiments merely represent several embodiments of the present disclosure, and the description thereof is more specific and detailed, but it should not be construed as limiting the scope of the present disclosure. It should be noted that, several modifications and improvements may be made for those of ordinary skill in the art without departing from the concept of the present disclosure, and these are all within the protection scope of the present disclosure. Therefore, the protection scope of the present disclosure shall be subject to the appended claims.

What is claimed is:

1. A method for generating a robot exploration path for a robot to move along, comprising:
   establishing a point cloud scene according to single-frame point cloud data collected by the robot, the point cloud scene including a plurality of data points;
   classifying and marking each of the data points, the classification mark including a ground point and an obstacle point, and taking the data points marked as ground points as a ground point cloud;
   generating a confidence map according to the ground point cloud, the confidence map being configured to display a location and a confidence of each of the ground points in the ground point cloud;
   generating a plurality of access nodes according to the confidence map;
   generating the robot exploration path according to the access nodes;
   wherein generating the confidence map according to the ground point cloud comprises:
   extracting a plurality of ground points in a local area to form a ground point set, the local area being a circular area with a current location as a circle center and a preset measurement radius as a radius;
   calculating a distance feature, an edge feature, and a visibility feature of each of the ground points in the ground point set;
   calculating a corresponding confidence according to the distance feature, the edge feature, and the visibility feature of each of the ground points in the ground point set; and
   updating the confidence of the corresponding ground point in the ground point cloud with the confidence of each of the ground points in the ground point set;
   wherein the generating the robot exploration path according to the access nodes comprises:
   classifying the access nodes into an open wide node set and an entry node set according to the distance feature, the edge feature, and the visibility feature of each of the access nodes, merging the open wide node set into an untraversed open wide node set, and merging the entry node set into an untraversed entry node set;
   determining whether the untraversed open wide node set is an empty set;
   if the untraversed open wide node set is not an empty set, calculating a walking cost of each of the access nodes by a greedy algorithm; and
   if the untraversed open wide node set is an empty set, generating the robot exploration path by a branch and bound method according to the node coordinate and the confidence of each of the entry nodes in the entry node set;
   moving the robot along the robot exploration path,
   wherein moving the robot along the robot exploration path comprises:
   if the untraversed open wide node set is not an empty set, moving to the access node with the lowest walking cost; and
   if the untraversed open wide node set is an empty set, moving the robot along the next best viewpoint in the robot exploration path.

2. The method of claim 1, wherein the robot exploration path includes a local path from a current access node to a next access node, and the method further comprises:
   calculating a shortest path from the current access node to the next access node;
   finding a path point closest to a quality assessment point on the shortest path, the quality assessment point being an under-scanned obstacle point;
   removing path points of the shortest path in an adjustment area, the adjustment area being a circle center area with the closest path point as a circle center and an adjustment radius as a radius;
   moving the closest path point towards the quality assessment point, a distance of the moving is the adjustment radius, and taking the moved closest path point as an anchor point; and
   connecting the shortest path and the anchor point in series by using a Bezier curve, to obtain a local path that can pass through the anchor point.

3. The method according to claim 2, further comprising:
   acquiring a local obstacle point cloud on two sides of the local path, the local obstacle point cloud including a plurality of local obstacle points;
   calculating a quality evaluation value corresponding to each of the local obstacle points according to a neighborhood obstacle point set corresponding to each of the local obstacle points; and
   taking a local obstacle point corresponding to a largest quality evaluation value as the quality evaluation point.

4. The method of claim 2, wherein an algorithm for calculating the shortest path is A* algorithm.

5. The method according to claim 1, wherein establishing the point cloud scene according to the single-frame point cloud data collected by the robot comprises:
acquiring the single-frame point cloud data through a lidar, the single-frame point cloud data including a plurality of single-frame data points collected by the robot at a current location, and each of the single-frame data points carrying a local coordinate;
converting the local coordinate of each of the single-frame data points into a global coordinate; and
accumulating each of the single-frame data points after the coordinate conversion as the data points in the global coordinate system to form the point cloud scene.

6. The method of claim 5, wherein each of the single-frame data points further carries an elevation value, and the classifying and marking each of the data points comprises:
extracting a plurality of single-frame data points in a sampling area, the sampling area being a circular area with the current location as a circle center and a preset extraction radius as a radius;
obtaining a lowest elevation value according to the elevation values corresponding to the plurality of single-frame data points in the circular area;
taking a plurality of single-frame data points equal to the lowest elevation value as initial ground seed points, and taking other single-frame data points in the circular area as to-be-classified data points;
inputting each of the initial ground seed points as a training sample into a Gaussian random process trainer for training to obtain a ground point recognition model, the ground point recognition model being configured to predict an elevation value of an input data point according to a distance between the input data point and the current location;
inputting each of the to-be-classified data points into the ground point recognition model to obtain a predicted elevation value corresponding to each of the to-be-classified data points;
comparing the elevation value of each of the to-be-classified data points with the predicted elevation value thereof, and marking to-be-classified data points that meet a prediction result and the initial ground seed points as the ground points; and
marking to-be-classified data points that do not meet the prediction result as the obstacle points.

7. The method of claim 1, wherein the generating the plurality of access nodes according to the confidence map comprises:
acquiring a plurality of local trough values in the confidence map using an extreme value detection method; and
taking ground points where the plurality of local trough values are located as the access nodes.

8. The method of claim 1, wherein the calculating the distance feature of each of the ground points in the ground point set comprises:
determining the distance feature of each of the ground points according to a relative distance between each of the ground points in the ground point set and the current location.

9. The method of claim 1, wherein the calculating the edge feature of each of the ground points in the ground point set comprises:
extracting a plurality of obstacle points in the local area to form an obstacle point set; and
determining the edge feature of each of the ground points according to a relative distance between each of the ground points in the ground point set and each of the obstacle points in the obstacle point set.

10. The method of claim 1, wherein the calculating the visibility feature of each of the ground points in the ground point set comprises:
extracting a plurality of obstacle points in the local area to form an obstacle point set;
taking an union set of the ground point set and the obstacle point set as a to-be-observed point set; and
determine a visibility feature of each of the ground points in the to-be-observed point set according to an observation viewpoint and the to-be-observed point set.

11. The method of claim 1, wherein the calculating the corresponding confidence according to the distance feature, the edge feature, and the visibility feature of each of the ground points in the ground point set comprises:
acquiring weight values corresponding to the distance feature, the edge feature, and the visibility feature respectively; and
acquiring the corresponding confidence of each of the ground points through the distance feature and the weight value corresponding to the distance feature, the edge feature and the weight value corresponding to the edge feature, and the visibility feature and the weight value corresponding to the visibility feature.

12. The method of claim 11, wherein a sum of the weight value corresponding to the distance feature, the weight value corresponding to the edge feature, and the weight value corresponding to the visibility feature is 1.

13. The method of claim 11, wherein the weight value corresponding to the distance feature is 0.1, the weight value corresponding to the edge feature is 0.5, and the weight value corresponding to the visibility feature is 0.4.

14. A computer device comprising a memory and a processor, the memory having a computer program stored therein, which, when executed by the processor, causing the processor to perform the steps of the method of claim 1.

15. A computer-readable storage medium having a computer program stored thereon which, when executed by a processor, causing the processor to perform the steps of the method of claim 1.

* * * * *